T. W. CROZIER.
NUT LOCK.
APPLICATION FILED OCT. 22, 1909.
992,709.
Patented May 16, 1911.
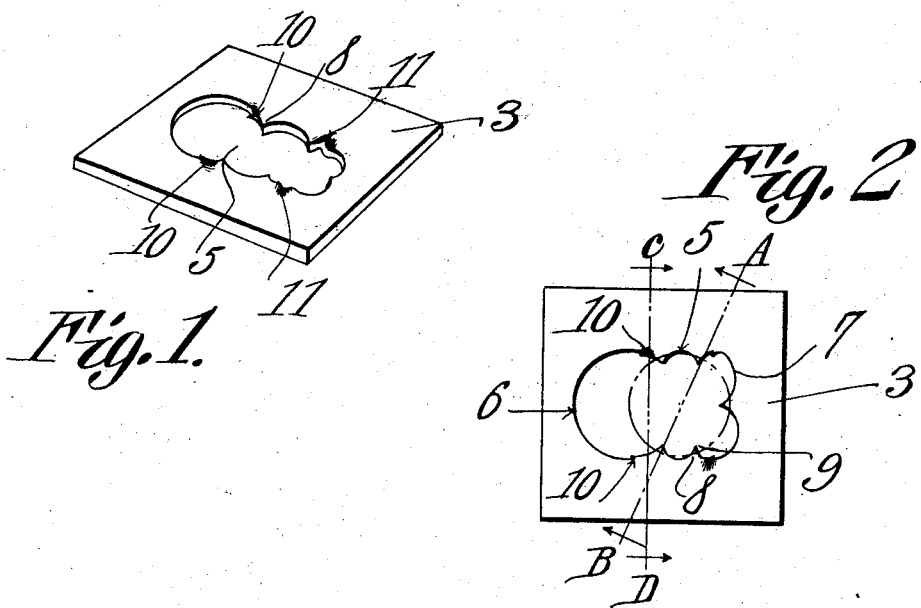
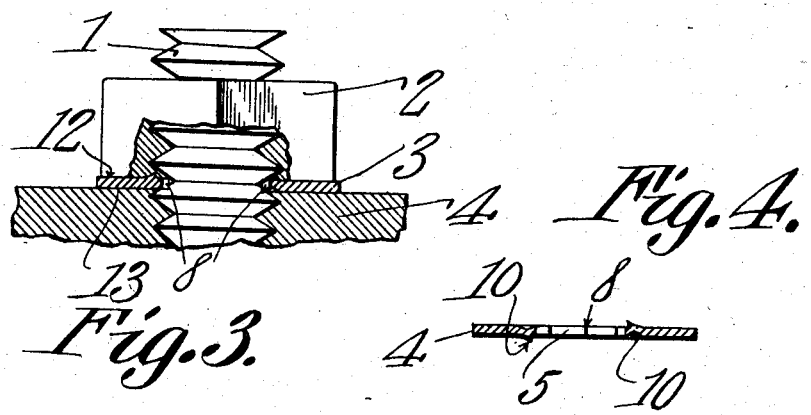
Inventor
Thomas W. Crozier.
Witnesses

UNITED STATES PATENT OFFICE.

THOMAS WASHINGTON CROZIER, OF CHRISTIANSBURG, VIRGINIA.

NUT-LOCK.

992,709.  Specification of Letters Patent.  Patented May 16, 1911.

Application filed October 22, 1909. Serial No. 524,061.

*To all whom it may concern:*

Be it known that I, THOMAS W. CROZIER, a citizen of the United States, residing at Christiansburg, in the county of Montgomery and State of Virginia, have invented a new and useful Nut-Lock, of which the following is a specification.

This invention relates to nut locks of the base washer type, and has for its object to produce a washer which when clamped in place will simultaneously engage the bolt, the nut, and the support beneath the washer.

In Patent No. 644,849 issued to me on March 6, 1900, I equipped the opening through the washer with spurs initially deflected out of its plane, so that when the washer and spurs were flattened by the pressure of the nut the spurs embedded the threads of the bolt. In that patent I made the washer somewhat larger than the nut and equipped it with a series of bends or deflections which engaged with the wrench faces when the parts were screwed up tight.

The object of the present invention is to employ substantially the same spurs for engaging the threads, along with other spurs or projections also formed in the opening through the washer and which when the latter is flattened out will embed both the nut and the support. In other words, I reduce the size of the washer to about that of the nut, and I lock the washer both to the nut and the support by projections which are at the inner edge of the washer rather than around its periphery; and thereby the same end is attained by the use of a washer having less material and which is quite easy to make. To attain these ends the invention embraces the structure hereinafter more fully described and claimed.

In the accompanying drawing forming part of this specification, Figure 1 is a perspective view of a nut lock constructed in accordance with my invention. Fig. 2 is a plan view of my improved nut lock. Fig. 3 is a fragmentary view in elevation of a bolt and nut with my improved nut lock applied thereto, with the nut lock shown in section as taken on the line A—B of Fig. 2. Fig. 4 is a longitudinal sectional view of my improved nut lock taken on the line C—D of Fig. 2.

Referring to the parts by their reference characters, 1 designates a threaded bolt shank upon which travels a nut 2 of the usual and well known kind. The nut lock 3 is in the nature of a washer that is mounted on the bolt between its nut 2 and the support 4 through which the bolt passes. The nut lock is formed with a bolt receiving recess 5, one end of which is preferably made with its marginal walls circular in contour as shown at 6, and large enough to slide over the threads of the bolt and permit the nut lock to be readily put in place. The opposite end of the bolt receiving recess is formed with its marginal walls scalloped, as shown at 7, to provide a series of projections 8 which enter the bolt threads and prevent the nut lock from being slid lengthwise of the bolt when the latter is moved into this end of the bolt receiving recess. The projections 8 terminate in sharpened edges 9 at their free ends which penetrate the metal of the threads when the nut is screwed home, as best shown in Fig. 3, and thus prevent further rotation of the nut lock in either direction. The side walls of the bolt receiving recess are mutilated to form a series of pointed spurs 10 and 11 which project laterally up and down from the engaging faces 12 and 13 of the nut lock. Each alternate spur in the series is bent oppositely from the adjacent spur so that as the nut is advanced to its final position the pointed spurs will alternately engage the adjacent faces of the nut 2 and the support 4. In addition to the spurs being formed to alternately engage the nut and support, the pointed end of each alternate spur is inclined oppositely from the adjacent spur in order to enable the spurs to be driven obliquely into both the support and the nut during the advancing movement of the nut. This construction is best seen in Fig. 1.

It will be noted that the pointed projections 8 extend wholly in the plane of the washer so that the projections will be uniformly embedded in the threads of the bolt when the nut is screwed home. The spurs 10 and 11 when embedded in the nut and support positively prevent the accidental backing off of the nut.

The nut lock may be formed from any suitable material, but is preferably stamped from material that is without temper and afterward highly tempered to enable the projections 8 and spurs 10 and 11 to penetrate the threads of the bolt and faces of the nut 2 and support 4, as above described.

The nut lock may be formed with a single impression of the forming die and without a material increase in cost over that of an ordinary washer.

What is claimed is:

A nut lock comprising a sheet metal washer whose body is flat and of substantially the same size as the nut, and whose bolt-opening is elongated and has one end enlarged so as to loosely admit the bolt, spurs in the edges of said opening initially deflected alternately to project beyond the opposite faces of the washer, and a series of other projections in the smaller end of said opening having their inner edges sharpened and spaced so as to enter the threads.

In testimony that I claim the foregoing as my own, I have hereto affixed my signature in the presence of two witnesses.

THOMAS WASHINGTON CROZIER.

Witnesses:
W. F. WALTERS,
W. M. PIERCE.

---

Copies of this patent may be obtained for five cents each, by addressing the "Commissioner of Patents, Washington, D. C."